US008839342B2

(12) United States Patent
Banks et al.

(10) Patent No.: US 8,839,342 B2
(45) Date of Patent: Sep. 16, 2014

(54) AUDIO VIDEO SYSTEM WITH EMBEDDED WIRELESS HOST AND WIRELESS SPEAKERS

(75) Inventors: Jano Banks, Cupertino, CA (US); David Buuck, Santa Clara, CA (US); Jon Norenberg, Modesto, CA (US); Brad Bozarth, Mountain View, CA (US); Eric Wiles, Sunnyvale, CA (US); Thomas Mader, Los Gatos, CA (US)

(73) Assignee: AliphCom, San Francisco, CA (US)

( * ) Notice: Subject to any disclaimer, the term of this patent is extended or adjusted under 35 U.S.C. 154(b) by 1288 days.

(21) Appl. No.: 11/859,460

(22) Filed: Sep. 21, 2007

(65) Prior Publication Data

US 2009/0079883 A1 Mar. 26, 2009

(51) Int. Cl.
| | |
|---|---|
| H04N 7/16 | (2011.01) |
| H04H 20/47 | (2008.01) |
| H04R 5/00 | (2006.01) |
| H04R 1/02 | (2006.01) |
| H04H 20/61 | (2008.01) |
| H04S 3/00 | (2006.01) |
| H04H 20/63 | (2008.01) |
| H04N 5/775 | (2006.01) |
| G09G 5/00 | (2006.01) |
| H04N 5/765 | (2006.01) |
| H04N 5/60 | (2006.01) |
| H04N 5/85 | (2006.01) |

(52) U.S. Cl.
CPC .............. *H04N 5/775* (2013.01); *H04H 20/61* (2013.01); *H04R 2420/07* (2013.01); *H04S 3/00* (2013.01); *H04H 20/63* (2013.01); *G09G 2370/12* (2013.01); *H04N 5/765* (2013.01); *H04N 5/60* (2013.01); *H04N 5/85* (2013.01); *G09G 5/003* (2013.01)
USPC .................. 725/153; 381/2; 381/28; 381/89; 348/738

(58) Field of Classification Search
USPC ................. 348/738; 455/130, 132, 137, 144, 455/151.2, 153.2, 402; 340/288, 538; 381/28, 89, 2; 725/153
See application file for complete search history.

(56) References Cited

U.S. PATENT DOCUMENTS

| | | | | |
|---|---|---|---|---|
| 6,466,832 | B1 * | 10/2002 | Zuqert et al. ..................... 700/94 |
| 2005/0141857 | A1 * | 6/2005 | Shimozawa et al. ............. 386/46 |
| 2006/0128442 | A1 * | 6/2006 | Cho ........................... 455/569.1 |
| 2006/0236354 | A1 * | 10/2006 | Sutardja ........................ 725/100 |
| 2006/0245608 | A1 * | 11/2006 | Lee et al. ...................... 381/315 |
| 2008/0175395 | A1 * | 7/2008 | Rice ................................. 381/2 |
| 2008/0207123 | A1 * | 8/2008 | Andersen ...................... 455/41.1 |
| 2008/0242222 | A1 * | 10/2008 | Bryce et al. ................... 455/3.06 |
| 2009/0023397 | A1 * | 1/2009 | Andersen ........................ 455/82 |
| 2009/0074112 | A1 * | 3/2009 | Coersmeier et al. .......... 375/340 |
| 2009/0204403 | A1 * | 8/2009 | Hollander et al. ............ 704/260 |

* cited by examiner

*Primary Examiner* — Gigi L Dubasky
(74) *Attorney, Agent, or Firm* — Kokka & Backus, PC (57) ABSTRACT

An audio video system is described that includes an AV receiver with a wireless audio module (WAM) host and without audio amplifier functionality. The system further includes a plurality of wireless speakers each having a WAM device to enable unidirectional or bidirectional communications with the WAM host. Each wireless speaker includes an amplifier that may be matched to a driver of the speaker to optimize the frequency response of the driver.

18 Claims, 11 Drawing Sheets

AUDIO VIDEO SYSTEM WITH EMBEDDED WIRELESS HOST AND WIRELESS SPEAKERS

FIELD

Embodiments of the invention pertain to an audio video system with an embedded wireless host communicating with wireless speakers.

BACKGROUND

In the consumer electronics and computer industries, transmission of audio signals from a host player to remote device speakers has generally been accomplished over an analog wired interface comprising speaker wires. With the advent of digital audio content, the desire to maintain the pristine digital audio signal as far as possible along the audio signal chain has motivated designers to pursue digital interfaces to replace unsightly, signal-loss-prone analog speaker wires.

The High-Definition Multimedia Interface (HDMI) is an all-digital audio/video interface capable of transmitting uncompressed streams. HDMI is compatible with High-bandwidth Digital Content Protection (HDCP) Digital Rights Management technology. HDMI provides an interface between any compatible digital audio/video source, such as a set-top box, a DVD player, a PC, a video game console, or an audio video (AV) receiver and a compatible digital audio and/or video monitor, such as a digital television (DTV).

Figure 1A:
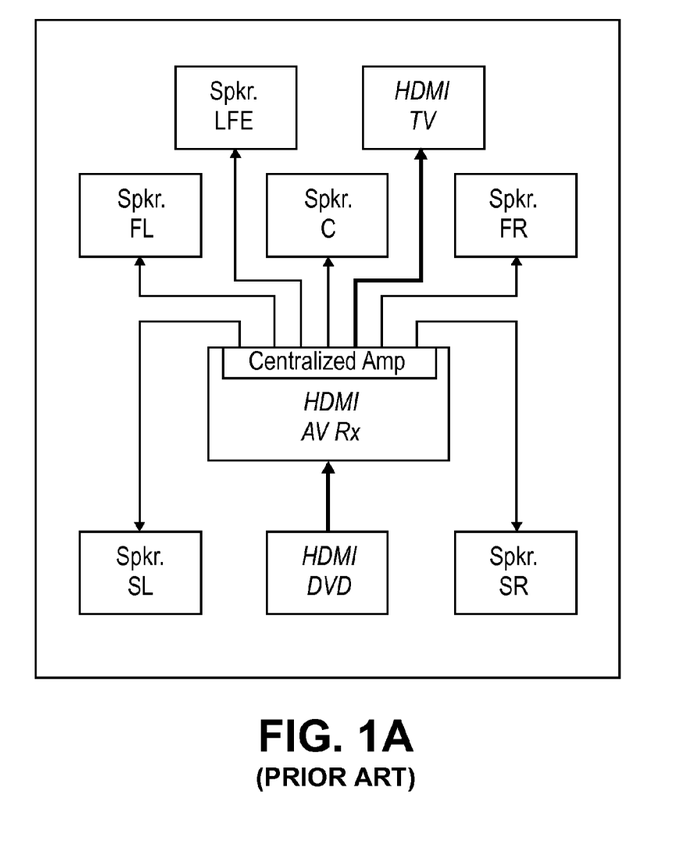
FIG. 1A is a block diagram of an example of a conventional prior art AV system having a functionality of a HDMI AV receiver with a centralized amplifier and coupled to analog speaker wires.

FIG. 1A shows an example of a conventional prior art audio video system that includes a source—an HDMI AV receiver with a centralized amplifier—connected via an HDMI cable to HDMI DVD player and also connected via an HDMI cable to a display (HDMI TV). The HDMI AV receiver is also connected via analog speaker wires to a set of 6 speakers, each connected point-to-point from the HDMI AV receiver. Speakers in FIG. 1A are identified as follows: Front Left (FL), Front Right (FR), Center (C), Surround Left (SL), Surround Right (SR), and Low Frequency Effect (LFE), also commonly referred to as a "subwoofer."

Figure 1B:
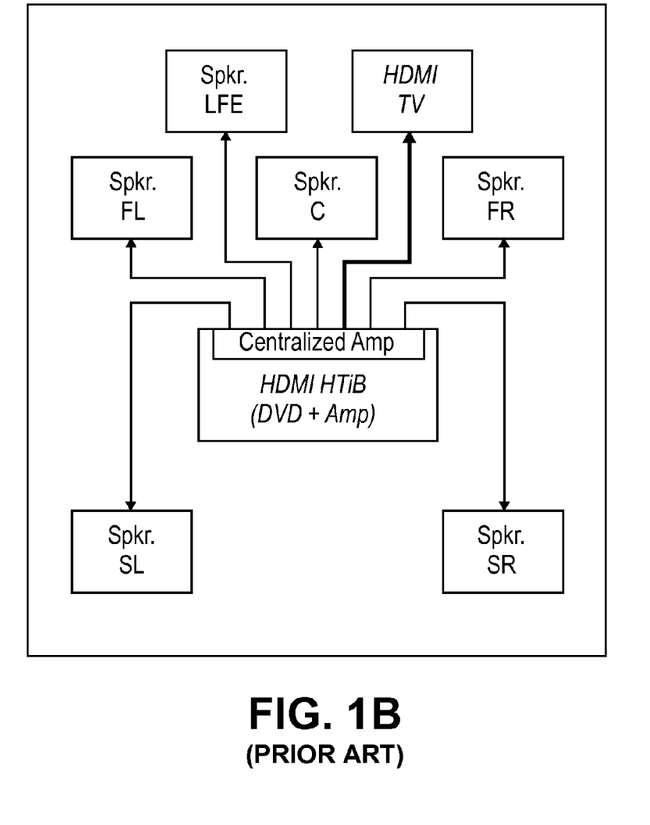
FIG. 1B is a block diagram of an example of a conventional prior art AV system having a HDMI HTiB with a centralized amplifier and coupled to analog speaker wires.

FIG. 1B illustrates another prior art system that includes a HDMI DVD player integrated with a AV RX and a centralized amplifier that forms a source—i.e., a home theatre in a box (HTiB)—connected via an HDMI cable to a display (HDMI TV). A HTiB refers to an integrated home entertainment package that typically includes a DVD player, surround sound capability, a radio tuner in a box. The HTiB is also connected via analog speaker wires to a set of 6 speakers, each connected point-to-point from the HTiB.

Figure 2A:
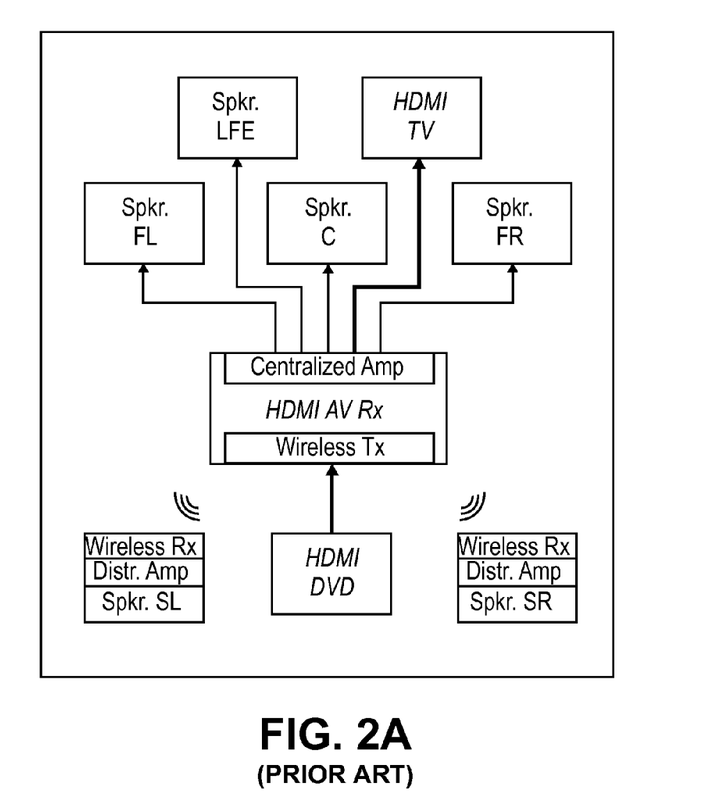
FIG. 2A is a block diagram of an example of a conventional prior art AV system having a functionality of a HDMI AV receiver with a centralized amplifier and coupled to analog speaker wires.
Figure 2B:
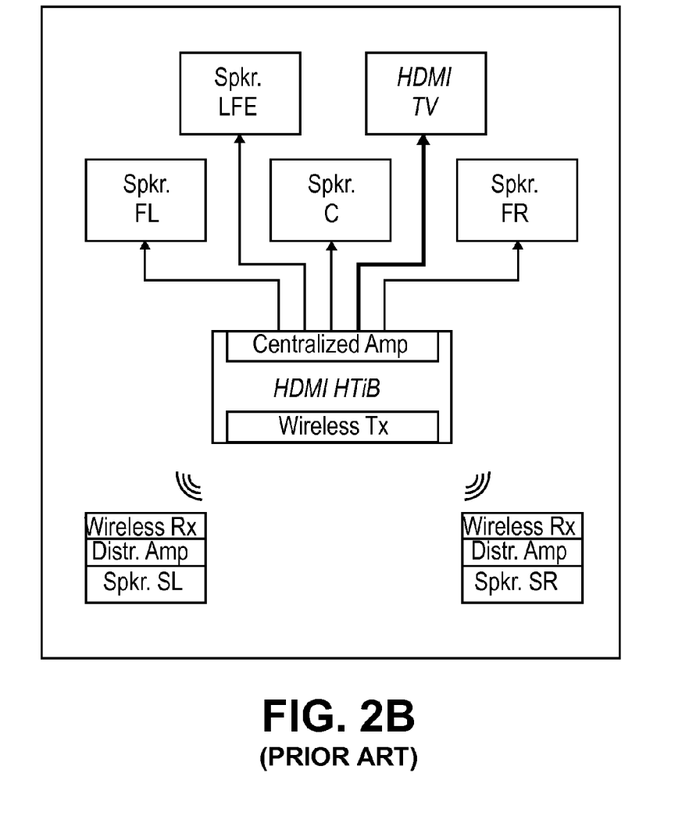
FIG. 2B is a block diagram of an example of a conventional prior art AV system having a HDMI HTiB with a centralized amplifier and coupled to analog speaker wires.

FIGS. 2A and 2B illustrate additional prior art systems similar to FIGS. 1A and 1B, respectively, except that speakers SR and SL are now wireless in FIGS. 2A and 2B. Also, each of these speakers includes a distributed amplifier in addition to the centralized amplifier located in the source.

These prior art conventional systems contain components that can maintain pristine digital audio and video from source to display through HDMI interconnects. By contrast, the interconnects from the source to most of the speakers is still analog via conventional speaker wires. For prior art systems containing 6 individual speakers, and other, more advanced systems which support up to 8 speakers or more, the speaker wire interconnections not only suffer from analog signal loss, but the speaker wire interconnections can be an eyesore or a wire-hiding challenge. Also, a surround-sound system with a large number of speakers and associated wiring causes further complications for installation and ease of modification.

SUMMARY

An audio video system is described that includes an AV receiver with a wireless audio module (WAM) host and without audio amplifier functionality. The system further includes a plurality of wireless speakers each having a WAM device to enable unidirectional or bidirectional communications with the WAM host. Each wireless speaker includes an amplifier that may be matched to a driver of the speaker to optimize the frequency response of the driver.

For one embodiment, the AV receiver without audio amplifier has a functionality of a HDMI AV receiver. For another embodiment, functionality of the AV receiver is located in a HDMI TV. For another embodiment, functionality of the AV receiver is located in a HDMI DVD player. For another embodiment, functionality of the AV receiver is located in an integrated HDMI TV/DVD player.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

An AV system is described that includes an AV receiver with a WAM host and without an audio amplifier functionality. The system further includes a plurality of wireless speakers each having a WAM device to enable unidirectional or bidirectional communications with the WAM host.

One intended advantage of the AV system is having each wireless speaker include an amplifier that is matched to a driver of the speaker to optimize the frequency response of each driver. Another intended advantage is the design flexibility based on having the WAM host located in various types of sources such as an AV receiver, a DVD player, a display, or an integrated DVD player/display. The absence of a centralized audio amplifier functionality in a source creates this design flexibility.

Figure 3:
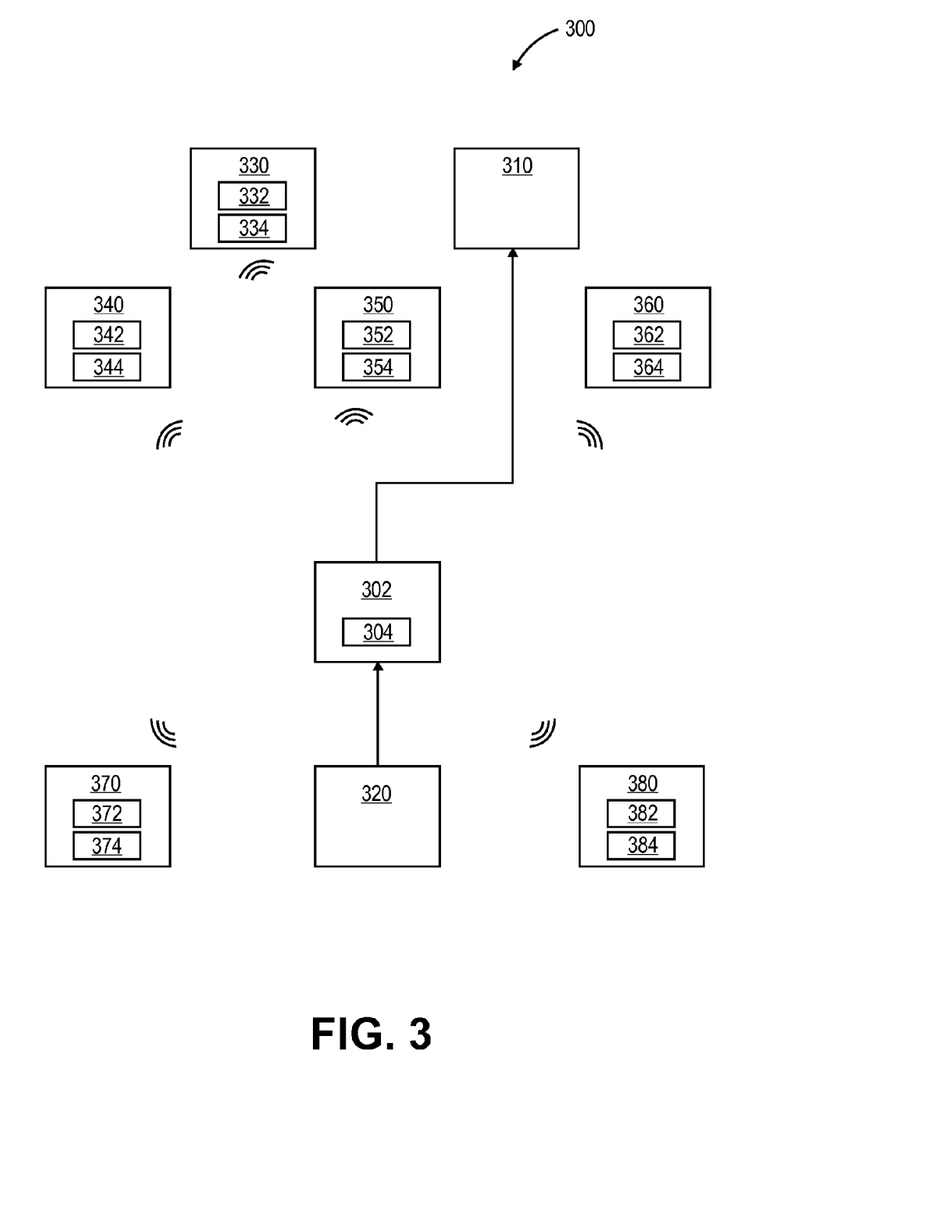
FIG. 3 is a block diagram of an apparatus having an AV receiver with a WAM host and without a centralized amplifier functionality in accordance with an embodiment of the invention.

FIG. 3 is a block diagram of an apparatus having an AV receiver functionality with a WAM host and without a centralized amplifier functionality in accordance with an embodiment of the invention. The apparatus 300 includes the AV receiver 302 with a WAM host 304. The AV receiver 302 may include the functionality of a HDMI AV receiver compatible with HDMI components. For one embodiment, the apparatus 300 further includes a plurality of wireless speakers 330, 340, 350, 360, 370, and 380 each having a WAM device 334, 344, 354, 364, 374, and 384, respectively, to enable communication with the WAM host 304. The WAM devices and WAM host may communicate unidirectionally or bidirectionally. For another embodiment, each wireless speaker 330, 340, 350, 360, 370, and 380 further includes a respective amplifier 332, 342, 352, 362, 372, and 382 matched to a driver of the respective speaker to optimize the frequency response of the driver.

Figure 4:
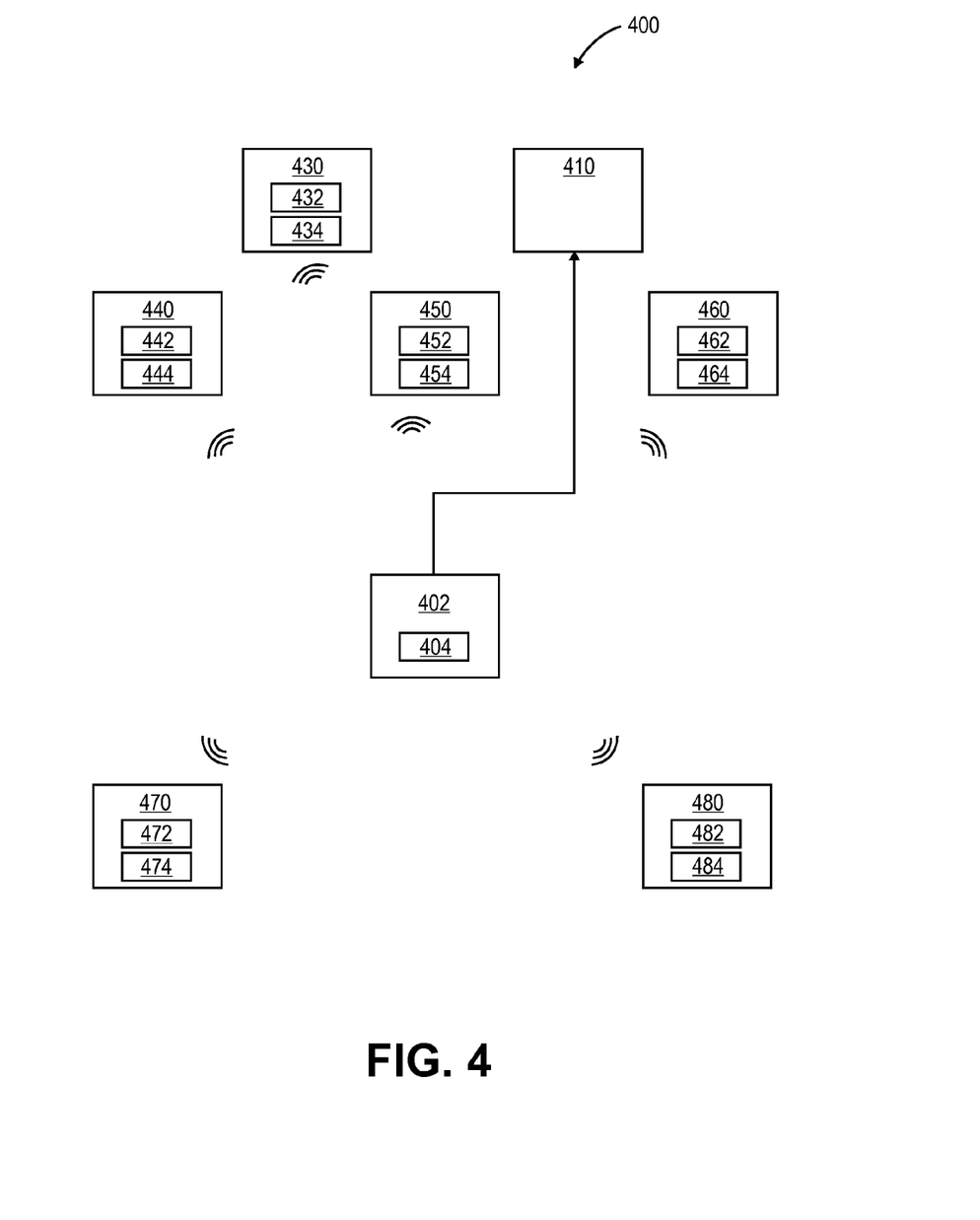
FIG. 4 is a block diagram of an AV system having a DVD player with a WAM host and without a centralized amplifier functionality in accordance with an embodiment of the invention.
Figure 5:
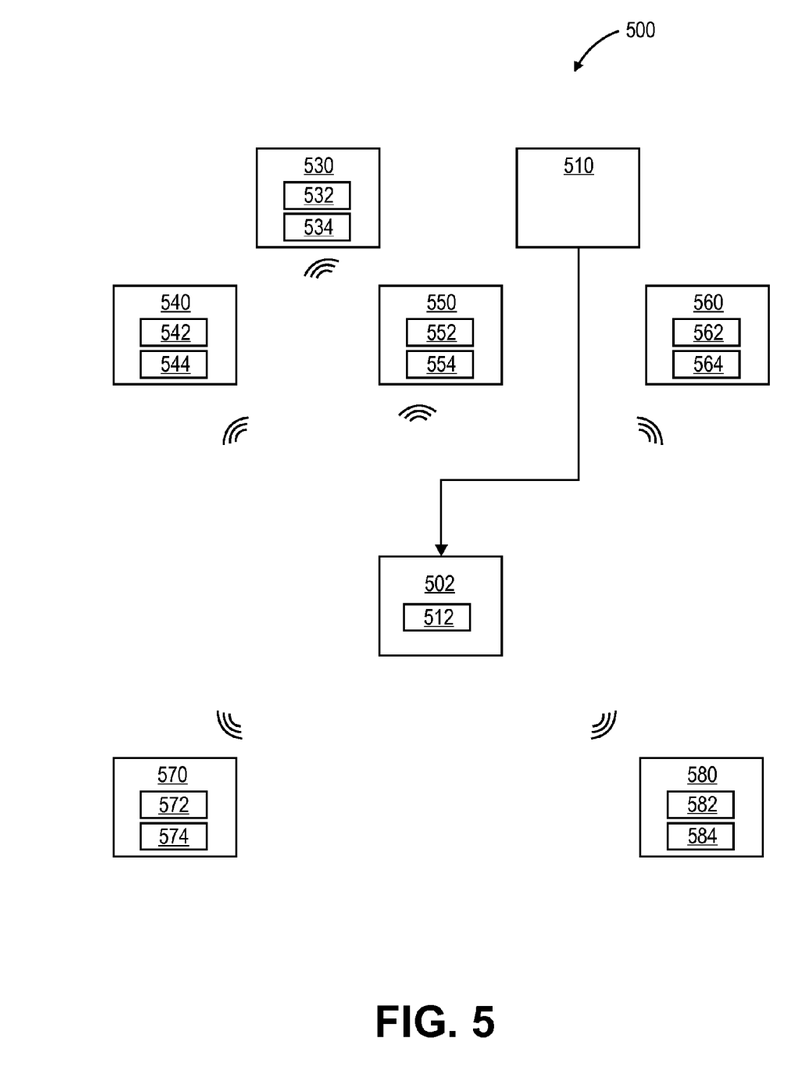
FIG. 5 is a block diagram of an AV system having a display with a WAM host and without a centralized amplifier functionality in accordance with an embodiment of the invention.
Figure 6:
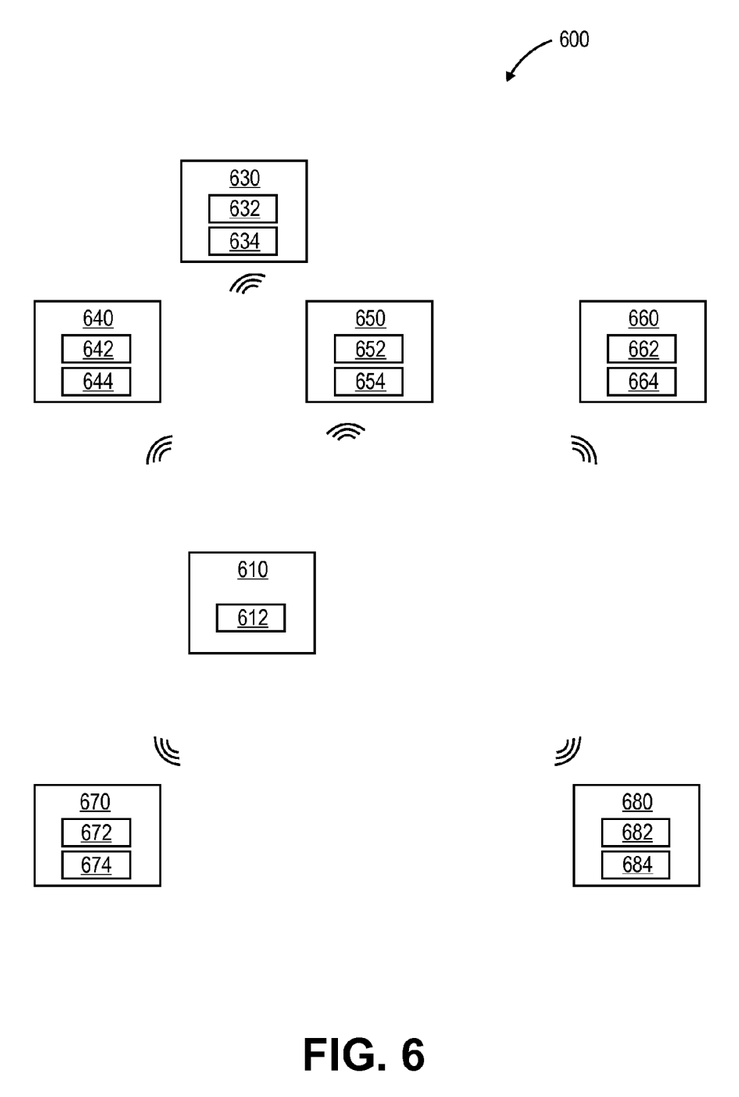
FIG. 6 is a block diagram of an AV system having an integrated DVD player and display with a WAM host and without a centralized amplifier functionality in accordance with an embodiment of the invention.

The wireless audio topology of FIG. 3 reduces clutter. The wireless audio topology of FIG. 3 also enables consolidation of devices and multiple locations of the WAM host, as shown in FIGS. 4-6. The functionality of an AV receiver has been combined with a DVD player 402 (as shown in FIG. 4), with a TV display 502 (as shown in FIG. 5), and with an integrated DVD player/TV 610 (as shown in FIG. 6). This consolidation is possible with the wireless audio topology because a major portion of the AV receiver functionality—namely the centralized amplifier for the speakers—has been effectively distributed to each of the speakers. The amplifier for the speaker is often large and heat-producing section. When the section is removed from the core components and replaced with a single WAM host, it is then possible to economically create multi-channel audio output capabilities from a source. Such a WAM host can reside inside a DVD player or TV chassis. Even better, neither the DVD player nor the TV need to add any extra connectors to provide such support, as the capability is made available via a wireless system. For example, associated antennas may be located internal to the component or box which contains the WAM host to provide the wireless system.

Note that the topology between WAM host and WAM devices is point-to-multipoint, implemented via an Ultra Wide Band Host/Device architecture. Also noteworthy is the ability for bidirectional communications over the wireless link, as depicted with the wireless beacon-like icons. The majority of the data transferred in such an audio application is from host to devices, but very important, infrequent data is sent from the devices to the host, communicating acknowledgements of data transfers and application-specific information, such as packet reception reliability statistics. Additionally, the absence of speaker wires enables a simpler-to-setup, less cluttered environment, and allows the pristine digital audio content to reach the speakers with no signal loss.

FIG. 4 is a block diagram of an AV system 400 that includes DVD player 402 with a WAM host 404 and without a centralized audio amplifier functionality. For one embodiment, the AV system 400 further includes a plurality of wireless speakers 430, 440, 450, 460, 470, and 480 each having a WAM device 434, 444, 454, 464, 474, and 484, respectively, to enable bidirectional communications with the WAM host 404.

For another embodiment, the DVD player 402 is a HDMI DVD player that includes the WAM host 404 to provide wireless audio capabilities. In this case, the digital audio video source is the DVD disc, whose data is extracted via the DVD drive, and then decoded in the DVD decoder, which creates separate video and audio outputs. The digital video output goes only to the HDMI transmitter (not shown), whereas the digital audio is sent to both the WAM Host and the HDMI transmitter. Video and audio in such arrangements are effectively synchronized at this point, and the HDMI link introduces effectively no latency for its video and audio going to a display, for example, so the wireless audio must meet acceptable latencies, else the system may exhibit annoying lip-sync issues.

For one embodiment, each wireless speaker 430, 440, 450, 460, 470, and 480 further includes an amplifier 432, 442, 452, 462, 472, and 482, respectively, matched to a driver of the respective speaker to optimize the frequency response of the driver. For another embodiment, at least one wireless speaker includes a plurality of drivers and a plurality of amplifiers with each amplifier being matched to a respective driver to optimize the frequency response of each driver. For example, a wireless speaker may include various types of drivers such as a woofer that produces low frequency sounds, a tweeter that produce the high frequency sounds, and a midrange driver that produces a range of frequencies in the middle of the sound spectrum. Each driver located in a wireless speaker can have a distributed amplifier optimized for the frequency range of the driver.

The wireless audio topology reduces clutter and also enables consolidation of devices and multiple locations of the WAM host, as shown in FIG. 4. The WAM host 404 has been combined with the DVD player 402 which may be a HDMI DVD player. This consolidation is possible with the wireless audio topology because a major portion of the AV receiver functionality—namely, the centralized amplifier for the speakers—has been effectively distributed to each of the wireless speakers. With this often large and heat-producing section removed from the core components and replaced by a single WAM Host, it is possible to economically create multi-channel audio output capabilities from a DVD player.

FIG. 5 is a block diagram of an AV system having a display with a WAM host and without a centralized amplifier. The AV system 500 includes the display 502 with a WAM host 512 and without a centralized audio amplifier. The display 502 may be a HDMI display that can be coupled to a HDMI DVD player 510. For one embodiment, the AV system 500 further includes a plurality of wireless speakers 530, 540, 550, 560, 570, and 580, each having a respective WAM device 534, 544, 554, 564, 574, and 584 to enable bidirectional communications with the WAM host 512. For another embodiment, each wireless speaker 530, 540, 550, 560, 570, and 580 further includes a respective amplifier 532, 542, 552, 562, 572, and 582 matched to a driver of the respective speaker to optimize the frequency response of the driver.

The wireless audio topology reduces clutter and also enables consolidation of devices and multiple locations of the WAM host, as shown in FIG. 5. The WAM host 512 has been combined with the display 502. This consolidation is possible with the wireless audio topology because a major portion of the AV receiver functionality—namely, the centralized amplifier for the speakers—has been effectively distributed to each of the wireless speakers. With this often large and heat-producing section removed from the core components and replaced by a single WAM Host, it is possible to economically create multi-channel audio output capabilities from the display 502.

FIG. 6 is a block diagram of an AV system 600 that includes the integrated DVD player and display 610 with a WAM host 612 and without a centralized audio amplifier. The integrated DVD player and display 610 may be a HDMI integrated DVD player and display. For one embodiment, the AV system 600 further includes a plurality of wireless speakers 630, 640, 650, 660, 670, and 680 each having a respective WAM device 634, 644, 654, 664, 674, and 684 to enable bidirectional communications with the WAM host 612. For another embodiment, each wireless speaker 630, 640, 650, 660, 670, and 680 further includes a respective amplifier 632, 642, 652, 662, 672, and 682 matched to a driver of the respective speaker to optimize the frequency response of each driver.

The wireless audio topology reduces clutter and also enables interesting consolidation of devices and multiple locations of the WAM host, as shown in FIG. 6. The WAM host 612 can been combined with the integrated DVD player and display 610 or an HDMI integrated DVD player and display. This consolidation is possible with the wireless audio topology because a major portion of the AV receiver functionality—namely, the centralized amplifier for the speakers—has been effectively distributed to each of the wireless speakers. With this often large and heat-producing section removed from the core components and replaced by a single WAM host, it is suddenly possible to economically create multi-channel audio output capabilities from the integrated DVD player and display 610.

FIGS. 3-6 have illustrated various AV systems with 5.1 surround sound based on having a plurality of wireless speakers including a front left speaker, a front right speaker, a center speaker, a surround left speaker, a surround right speaker, and a first low frequency effect ("LFE") speaker. The various AV systems may further include a side left surround speaker and a side right surround speaker to provide 7.1 surround sound. The various AV systems may further include a second LFE speaker. The various AV systems can provide up to 127 separate wireless audio channels enabling various surround sound arrangements such as 10.2 theatre surround, 22.2 surround, or 22.3 surround.

High quality pristine digital audio can be provided for various embodiments with no speaker wiring required. For example, a consumer can quickly and easily install the wireless speakers with no stripping of speaker wires. Also, a consumer has a general freedom to decorate or redecorate a building or residence without being limited with speaker wire concerns. A consumer can also purchase an AV system including the wireless speakers in a piecemeal manner.

Figure 7A:
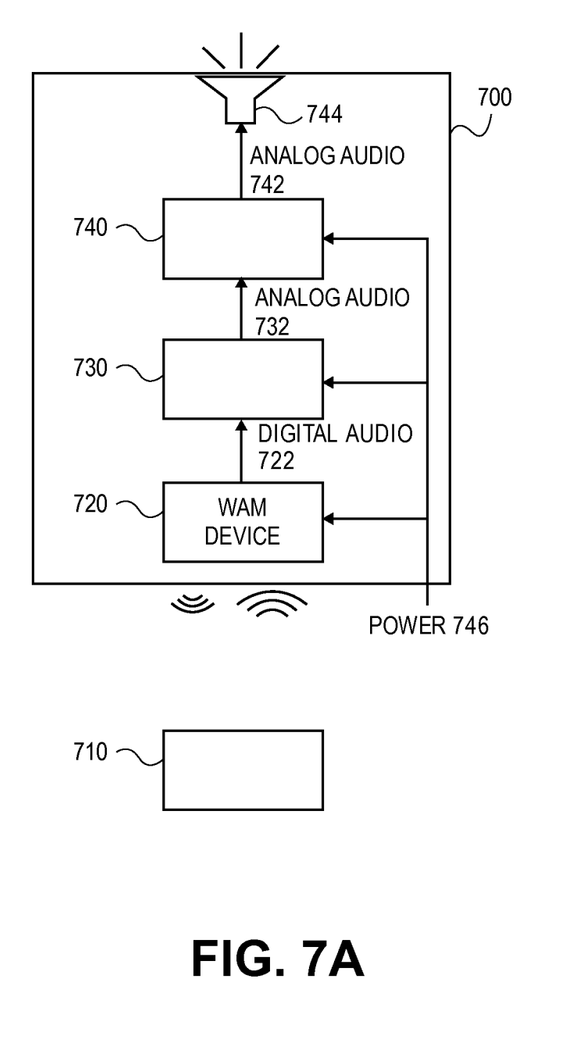
FIG. 7A is a block diagram of a wireless speaker with a WAM Device in accordance with an embodiment of the invention.

FIG. 7A is a block diagram of a wireless speaker subsystem with a WAM device communicating with a WAM host in accordance with an embodiment of the invention. To illustrate the effective distribution of the conventional centralized amplifier, FIG. 7A shows the internals of the wireless speaker subsystem 700. The wireless speaker subsystem 700 includes the WAM device 720, which receives the wireless audio data and auxiliary packets from the WAM host 710 as well as sends back auxiliary information to the host 710, as required, and further illustrated in FIG. 7B. The wireless speaker subsystem 700 further includes an audio Digital-to-Analog Converter (DAC) 730, which takes in the digital audio data from the WAM device 720, and converts it to analog. This analog line-level signal is then sent to the audio amplifier 740, which can be specifically designed to match the loudspeaker driver 744, as it is resident in the same enclosure as the driver 744 in this topology. Power 746 is specifically noted in this block diagram to show that there is a need for power in the wireless speakers to allow the active electronics to be powered, as well as to allocate sufficient power for the audio amplifier performance desired for the subsystem 700.

Figure 7B:
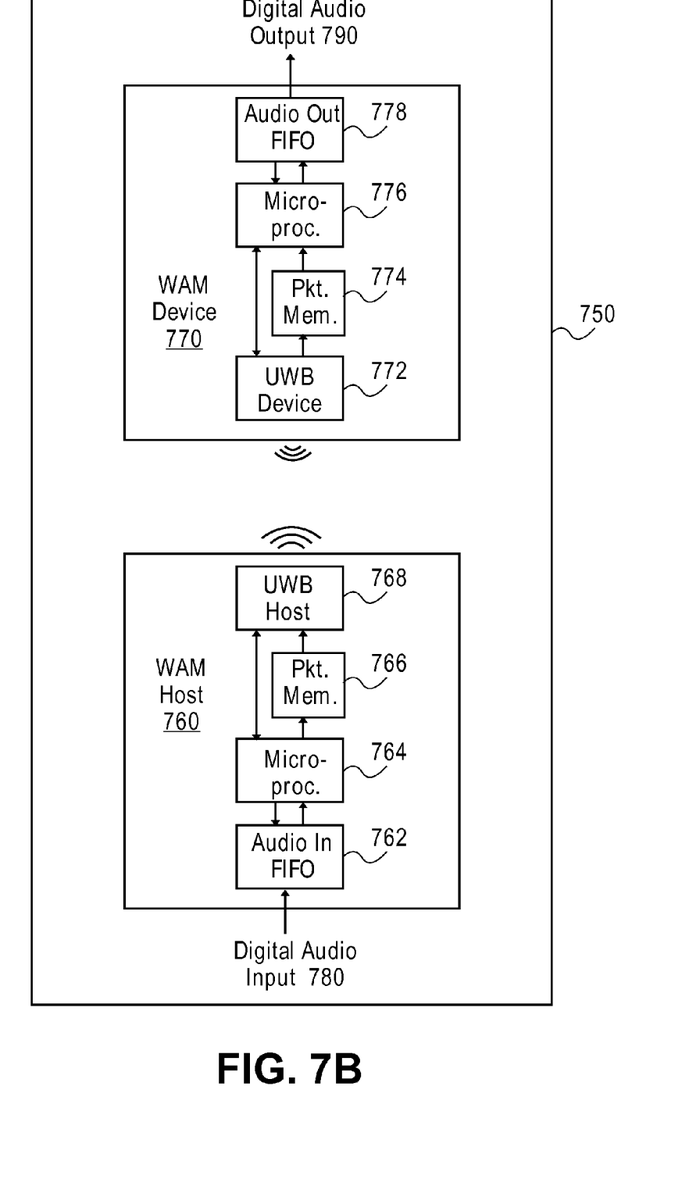
FIG. 7B is a block diagram of a system with a WAM Host communicating with a WAM Device in accordance with an embodiment of the invention.

FIG. 7B is a block diagram of a system with a WAM host communicating with a WAM device in accordance with an embodiment of the invention. The WAM host 760 includes an audio-in first-in first-out buffer (FIFO) 762, a microprocessor 764, memory 766 allocated for packet storage, and a Ultra Wideband (UWB) host 768. The WAM device 770 includes an audio out FIFO 778, a microprocessor 776, memory 774 allocated for packet storage, and a UWB device 772. The system 750 receives digital audio input 780 from a source, sends it wirelessly over UWB, and produces digital audio output 790 from each device 770. The microprocessor included in each WAM embodiment must perform sophisticated management and execute complex algorithms tailored to the wireless medium and the dynamic system requirements. Although not shown in FIG. 7B, the WAM host must process and transmit all digital audio channels, while a WAM device might only consume a single audio channel. The WAM host's management of communications, data routing, and synchronization for all the audio channels supported in a system is a significant task.

Figure 8:
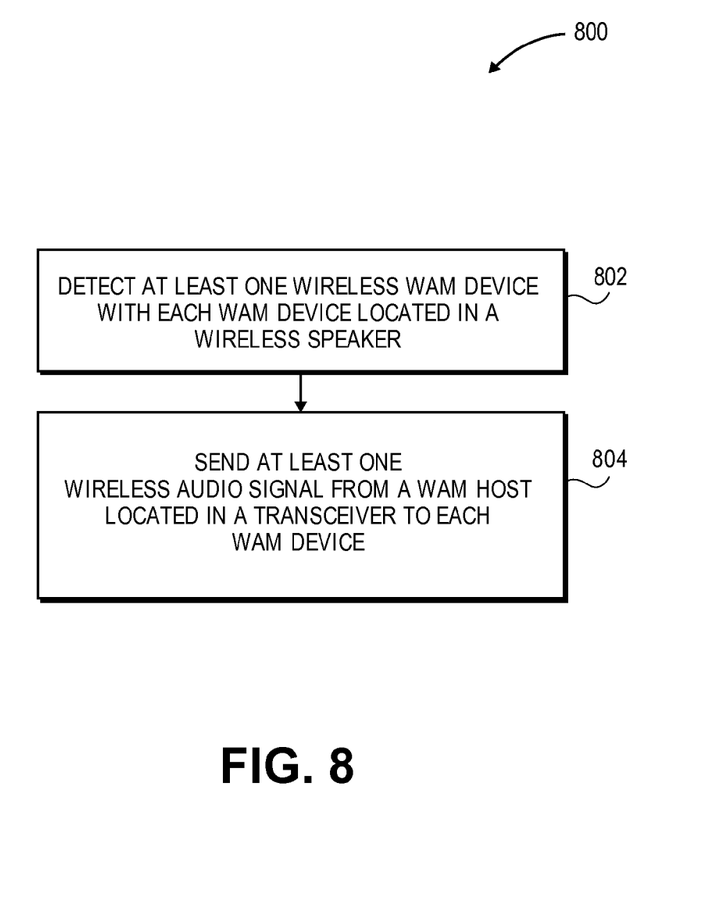
FIG. 8 is a flowchart of a method for providing wireless audio communications in accordance with an embodiment of the present invention.

FIG. 8 is a flowchart of a method for providing wireless audio communications in accordance with an embodiment of the present invention. The method 800 includes detecting at least one wireless WAM device with each WAM device located in a wireless speaker at block 802. For one embodiment, each wireless speaker includes an amplifier matched to an associated driver to optimize the frequency response of each driver. The method 800 further includes sending at least one wireless audio signal from a WAM host located in a transceiver to each WAM device at block 804.

The transceiver may be a HDMI transceiver located in a source such as a HDMI TV, a HDMI DVD player, or an integrated HDMI TV/DVD player. The source includes no audio amplifier. At least one wireless speaker may include a plurality of drivers and a plurality of amplifiers with each driver being matched to an amplifier to optimize the frequency response of the driver.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A system, comprising:
    an audio video (AV) receiver with a wireless audio module (WAM) host and without a centralized audio amplifier functionality, the WAM host being implemented using a point-to-multipoint network topology using an Ultra-Wideband (UWB) host/device architecture,
    wherein the WAM host including a first microprocessor,
an audio-in first-in-first-out (FIFO) buffer coupled with a digital audio input, the audio-in FIFO buffer coupled with a first input and a first output of the first microprocessor,
a first packet memory operative for packet storage and coupled with a second output of the first microprocessor, and
an UWB host coupled with an output of the first packet memory and bi-directionally coupled with the first microprocessor, the UWB host operative to wirelessly transmit digital audio received on the digital audio input; and
a plurality of wireless speakers each having a WAM device configured for bi-directional communication with the WAM host over a wireless link between each WAM device and the WAM host, wherein each wireless speaker includes an amplifier to amplify communications received from the WAM host and to which at least a part of the centralized audio amplifier functionality is distributed,
wherein each WAM device including
an UWB device operative to wirelessly receive the digital audio transmitted by the UWB host,
a second packet memory operative for packet storage and coupled with an output of the UWB device,
a second microprocessor bi-directionally coupled with the UWB device and with an output of the second packet memory, and
an audio-out FIFO buffer coupled with an input and an output of the second microprocessor, and the audio-out FIFO buffer coupled with a digital audio output operative to output the digital audio.

2. The system of claim 1, wherein functionality of the AV receiver is located in one of a TV, a DVD player, and an integrated TV/DVD player.

3. The system of claim 1, wherein the AV receiver has a functionality of a high definition multimedia interface (HDMI) AV receiver.

4. The system of claim 3, wherein the functionality of the HDMI AV receiver is located in one of a HDMI TV, a HDMI DVD player, and an integrated HDMI TV/DVD player.

5. The system of claim 1, wherein the plurality of wireless speakers comprise a front left speaker, a front right speaker, a center speaker, a surround left speaker, a surround right speaker, and a first low frequency effect (LFE) speaker.

6. The system of claim 5, wherein the plurality of wireless speakers further comprise a side left surround speaker, a side right surround speaker, and a second LFE speaker.

7. The system of claim 1, wherein the bi-directional communication comprises a plurality of digital channels.

8. The system of claim 1, wherein each wireless speaker comprises an amplifier matched to a driver of the speaker to optimize the frequency response of each driver.

9. The system of claim 1, wherein at least one wireless speaker comprises a plurality of drivers and a plurality of amplifiers with each amplifier being matched to a driver to optimize the frequency response of each driver.

10. The system of claim 1, wherein a wireless communication sent from each WAM device to the WAM host over the wireless link includes data selected from the group consisting of acknowledgement of data transfer, application specific information, and packet reception reliability statistics.

11. A method for optimizing wireless audio communications, comprising:
detecting at least one wireless audio module (WAM) device with each WAM device located in a wireless speaker, wherein each wireless speaker includes an amplifier matched to an associated driver to optimize frequency response of each driver,
wherein each WAM device including a first microprocessor, an Ultra-Wideband (UWB) device bi-directionally coupled with the first microprocessor, and an audio-out first-in-first-out (FIFO) buffer electrically coupled with a first input and a first output of the first microprocessor and electrically coupled with a digital audio output; and
sending at least one wireless audio signal from a WAM host located in a transceiver that is included in audio video (AV) receiver without a centralized audio amplifier functionality to the each WAM device, the WAM host being implemented using a point-to-multipoint network topology using the UWB host/device architecture, the each WAM device configured for bi-directional communication with the WAM host using a wireless link between the each WAM device and the WAM host,
wherein the WAM host including a second microprocessor, an UWB host bi-directionally coupled with the second microprocessor, and an audio-in FIFO buffer electrically coupled with an input and an output of the second microprocessor and electrically coupled with a digital audio input, and wherein at least a part of the centralized audio amplifier functionality is distributed to the wireless speaker.

12. The method of claim 11, wherein at least one wireless speaker comprises a plurality of drivers and a plurality of amplifiers with each driver being matched to an amplifier to optimize the frequency response of the driver.

13. The method of claim 11, wherein a wireless communication sent from each WAM device to the WAM host over the wireless link includes data selected from the group consisting of acknowledgement of data transfer, application specific information, and packet reception reliability statistics.

14. A system, comprising:
a display including an audio video (AV) receiver without a centralized audio amplifier functionality and having a wireless audio module (WAM) host and without a central audio amplifier, the WAM host being implemented using a point-to-multipoint network topology using an Ultra-Wideband (UWB) host/device architecture,
wherein the WAM host including
a first microprocessor,
an audio-in first-in-first-out (FIFO) buffer coupled with a digital audio input, the audio-in FIFO buffer coupled with a first input and a first output of the first microprocessor,
a first packet memory operative for packet storage and coupled with a second output of the first microprocessor, and
an UWB host coupled with an output of the first packet memory and bi-directionally coupled with the first microprocessor, the UWB host operative to wirelessly transmit digital audio received on the digital audio input; and
a plurality of wireless speakers each having a WAM device configured for bi\-directional communications with the WAM host over a wireless link between each WAM device and the WAM host, each wireless speaker including an amplifier to amplify audio communications received from the WAM host and to which at least a part of the audio amplifier functionality is distributed,
wherein each WAM device including
an UWB device operative to wirelessly receive the digital audio transmitted by the UWB host, a second packet memory operative for packet storage and coupled with an output of the UWB device, a second microprocessor bi-directionally coupled with the UWB device and with an output of the second packet memory, and an audio-out FIFO buffer coupled with an input and an output of the second microprocessor, and the audio-out FIFO buffer coupled with a digital audio output operative to output the digital audio.

15. The system of claim 14, wherein the plurality of wireless speakers comprise a front left speaker, a front right speaker, a center speaker, a surround left speaker, a surround right speaker, and a first low frequency effect (LFE) speaker.

16. The system of claim 14, wherein each wireless speaker comprises an amplifier matched to a driver of the speaker to optimize the frequency response of the driver.

17. The system of claim 14, wherein the display is a high definition multimedia interface (HDMI) display.

18. The system of claim 14, wherein a wireless communication sent from each WAM device to the WAM host over the wireless link includes data selected from the group consisting of acknowledgement of data transfer, application specific information, and packet reception reliability statistics.

\* \* \* \* \*